US008873094B2

(12) United States Patent
Bell et al.

(10) Patent No.: US 8,873,094 B2
(45) Date of Patent: Oct. 28, 2014

(54) METHODS AND SYSTEMS FOR PRINT DOCUMENT RELEASE VIA MOBILE DEVICE

(75) Inventors: Lynn Bell, Fairport, NY (US); Matthew Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 21 days.

(21) Appl. No.: 13/487,130

(22) Filed: Jun. 1, 2012

(65) Prior Publication Data

US 2013/0321856 A1 Dec. 5, 2013

(51) Int. Cl.
*G06F 3/12* (2006.01)

(52) U.S. Cl.
USPC .......................................... 358/1.15

(58) Field of Classification Search
CPC ............... H04N 1/00307; G06F 17/30011; G06F 3/1292
USPC ....................................... 358/1.15
See application file for complete search history.

(56) References Cited

U.S. PATENT DOCUMENTS

| 7,528,974 | B2 | 5/2009 | Gecht et al. |
| 7,561,294 | B2 | 7/2009 | Ciriza et al. |
| 7,576,883 | B2 | 8/2009 | Ragnet et al. |
| 7,667,865 | B2 | 2/2010 | Ciriza et al. |
| 7,970,838 | B2 | 6/2011 | Pothos et al. |
| 2003/0142801 | A1 | 7/2003 | Pecht |
| 2004/0137919 | A1* | 7/2004 | Biundo ........................ 455/466 |
| 2004/0151291 | A1 | 8/2004 | Song |
| 2004/0218213 | A1* | 11/2004 | Shimizu et al. .............. 358/1.15 |
| 2007/0195364 | A1* | 8/2007 | Umehara et al. ............. 358/1.15 |
| 2011/0092249 | A1 | 4/2011 | Evanitsky |
| 2011/0211218 | A1* | 9/2011 | Gilmore et al. .............. 358/1.15 |
| 2012/0057189 | A1 | 3/2012 | DeRoller |
| 2012/0262754 | A1* | 10/2012 | Hwang ........................ 358/1.15 |
| 2012/0289191 | A1* | 11/2012 | Puura ............................ 455/410 |

FOREIGN PATENT DOCUMENTS

| EP | 1691270 | 8/2006 |
| GB | 2418761 | 4/2006 |
| GB | 2486629 | 6/2012 |

OTHER PUBLICATIONS

Matthew DeRoller. "Method and System for Providing Print Governance Interaction for Remote Rendering Applications," U.S. Appl. No. 12/959,066, filed Dec. 2, 2010.
Matthew DeRoller. "Mobile Access Notification Service Interface," U.S. Appl. No. 13/096,681, filed Apr. 28, 2011.
Nishchai Patars. "Mobile Scan Method and Systesm," U.S. Appl. No, 13/459,463, filed Apr. 30, 2012.
Jeffrey Earl et al. "Method and System for Delivering Device Specific Service Documentation to a Mobile Platform," U. S. Appl. No. 13/290,575, filed Nov. 7, 2011.

* cited by examiner

*Primary Examiner* — Eric A Rust
(74) *Attorney, Agent, or Firm* — MH2 Technology Law Group LLP

(57) ABSTRACT

A system and method for print document release via mobile device by receiving one or more text messages from the mobile device, wherein the one more text messages includes a mobile print command and a document identification number, parsing the one or more text messages, and releasing a document to a printer, wherein the document is associated with the document identification number.

14 Claims, 4 Drawing Sheets

METHODS AND SYSTEMS FOR PRINT DOCUMENT RELEASE VIA MOBILE DEVICE

TECHNICAL FIELD

The present disclosure relates generally to methods, systems, and computer-readable media for mobile print document release using text messaging.

BACKGROUND

Traditionally, before a user on a computing device could submit a document to a printer for printing, the user needed to connect the computing device to the printer via a direct or local area connection and install appropriate print driver software on the computing device. The process was particularly demanding for mobile computing devices, such as laptop computers, that utilized different printers in different locations.

Mobile printing solutions can facilitate the process by allowing users to submit documents to central repositories which are connected to and configured to interface with a large number of printers in different locations. Because the user's computing device does not directly interface with a printer, the computing device does not require installation of print driver software, and the computing device does not have to be directly or locally connected to the printer. Accordingly, mobile printing solutions can be easily and efficiently utilized by mobile devices to print to multiple printers in multiple locations.

Currently, mobile printing solutions require computing devices, such as laptop computers, tablet computers, and smartphones, which are capable of running suitable web browsers or custom mobile printing applications. However, laptop computers, without specialized hardware, typically require an active internet connection in order to utilize mobile printing solutions, which may not be readily available to a user who is not at their home or office location.

Smartphones and tablet computers with high-speed data access via mobile broadband are particularly useful from mobile locations, and users of such devices can utilize mobile printing solutions without an active internet connection from a wide range of locations. However, smartphones, tablet computers, and high-speed data access plans can be expensive, and many potential mobile printing solution users may not have access to such devices or plans. Accordingly, there is a need for mobile printing solutions that can be utilized by mobile devices that do not or cannot run suitable web browsers or custom mobile printing applications.

SUMMARY OF THE DISCLOSURE

The present disclosure relates generally to methods, systems, and computer readable media for providing these and other improvements to mobile printing technologies.

A mobile print system can allow for the transmission and receipt of text messages, such as Short Message Service (hereinafter, "SMS") messages, by a mobile print server. A user can send an SMS message from a mobile device to the mobile print server. The message can include instructions to release a document to a printer. Additionally, the message can include, for example, a document identification code, a printer identification code, a user password, and additional printing parameters.

The mobile print server can verify authentication credentials of the SMS message source, such as a source phone number and/or a user password. Subsequently, the mobile print server can determine if additional information or parameters are required to release the document to the printer and transmit an SMS message to the source phone with further instructions, if necessary.

Once the mobile print server has obtained sufficient information and/or parameters, the mobile print server can retrieve the requested document from a document repository and release the document to the request printer.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
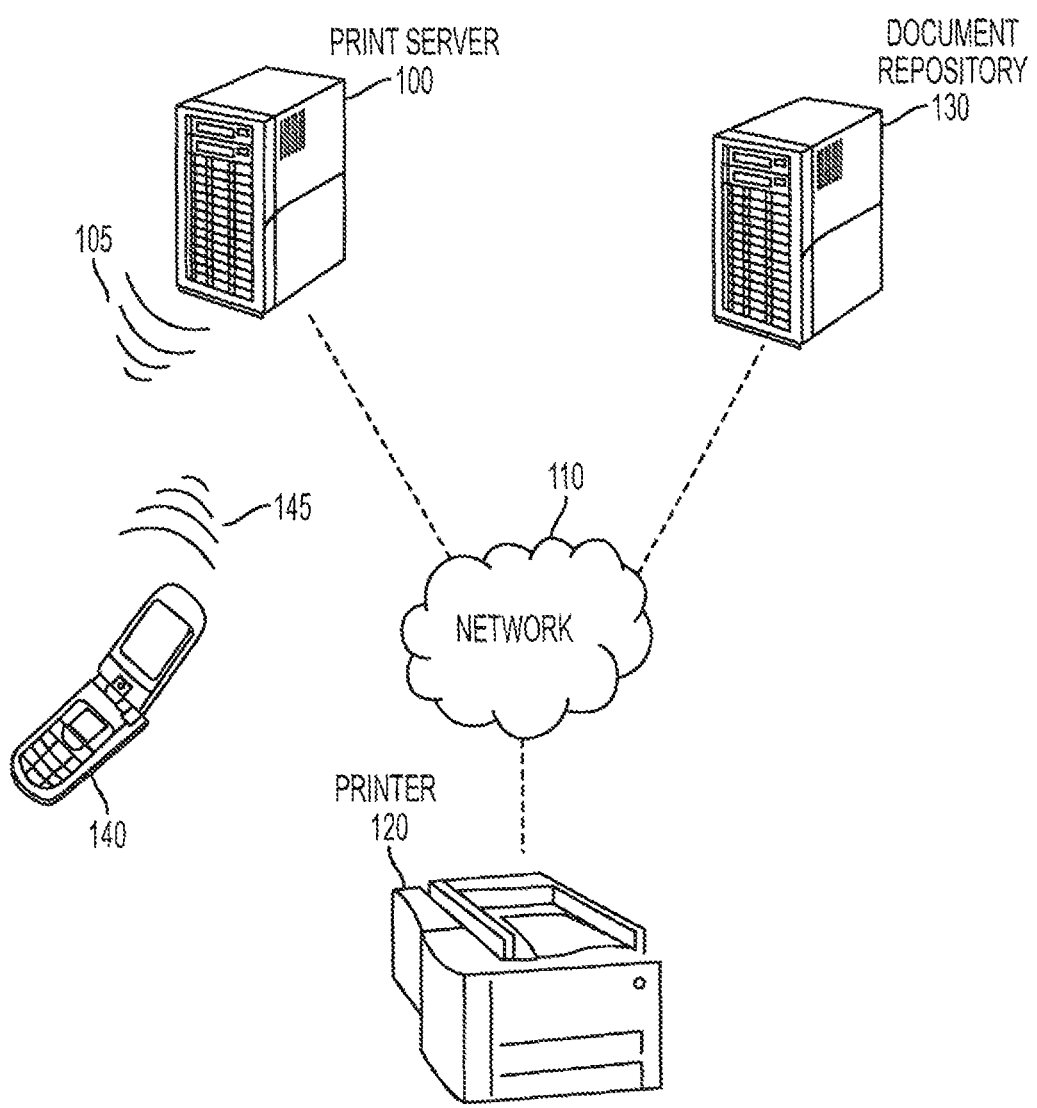
FIG. 1 is a diagram depicting an exemplary mobile print system environment, consistent with certain disclosed embodiments.

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary mobile print system environment, consistent with certain disclosed embodiments. As depicted in FIG. 1, the environment can comprise print server 100 connected to network 110. Network 110 can comprise any type of communication network and can be, for example, a global or wide area network, such as the internet, or, alternately, network 110 can be a local area network.

In some embodiments, printer server 100 can communicate with printer 120 and document repository 130 via network 110. Although network 110 is depicted in FIG. 1 as a single communication network, network 110 can comprise one or more wide area and/or local communication networks. For example, print server 100 can communicate with document repository 130 via a local communication network and communicate with printer 120 via a global communication network. Additionally, although print server 100 and document repository 130 are depicted as separate devices, in embodiments, print server 100 and document repository 130 can be combined as a single device. Further, in some embodiments, printer 120 can be combined with one or more of print server 100 and document repository 130 as a single device.

Print server 100 can represent any type of computing device capable of communicating with printer 120 and/or document repository 130. Print server 100 can represent a single computing device or a plurality of computing devices in various locations. In embodiments, print server 100 can communicate with both document repository 130 and printer 120, while, in further embodiments, print server 100 may communicate with only one of document repository 130 and printer 120.

Document repository 130 can represent any type of computing device capable of storing document information and able to communicate with print server 100 and/or printer 120. Document repository 130 can represent a single computing device or a plurality of computing devices in various locations. In embodiments, document repository 130 can communicate with both print server 100 and printer 120, while, in further embodiments, document repository 130 may communicate with only one of print server 100 and printer 120. For example, document repository 130 can receive a request from print server 100 to release a document to printer 120. Document repository 130 may then directly communicate with printer 120 to release the requested document. As an additional example, document repository 130 may receive a request for a document from print server 100 and may transmit the requested document to printer server 100. Print server 100 may then send the document to printer 120. As a further example, print server 100 may send a document print request directly to printer 120 and printer 120 can request the document from document repository 130.

Printer 120 can represent any type of printing device capable of communicating with print server 100 and/or document repository 130 and capable of printing an electronic document to a tangible medium, such as paper. Printer 120 can represent a single printing device or a plurality of printing devices in various locations. In embodiments, printer 120 can represent a multifunction printing device capable of functionality that includes, but is not limited to, printing, scanning, faxing, and photocopying. Additionally, printer 120 can utilize any form of printing technology, which includes, but is not limited to, toner-based, liquid inkjet, solid ink, dye-sublimation, thermal, and ultraviolet printing.

Print server 100 can be configured to send and receive text messages, such as SMS message 105 and SMS message 145, via any communication network compatible with text message or SMS technology. For example, print server 100 can send and receive SMS messages via a cellular network or a broadband network.

Print server 100 can receive SMS message 145 from phone 140 and send SMS message 105 to phone 140. Phone 140 can represent any type of device capable of sending and receiving text messages. In embodiments, phone 140 can be a feature phone. As used herein, a "feature phone" can refer to a mobile device that does not have the full computing ability of a smartphone but can include functionality beyond voice calling, such as SMS messaging. However, phone 140 is not limited to feature phone limitations and, in embodiments, phone 140 can represent a more advanced mobile device, such as a smartphone.

SMS message 105 and SMS message 145 can represent any type of text message and include one or more characters of text. Additionally, SMS message 105 and SMS message 145 can utilize any standard set of communication protocol compatible with text messaging technology, such as Global System for Mobile Communications (GSM®), 3rd generation mobile telecommunications standards (3G), 4th generation mobile telecommunications standards (4G), Simple Mail Transfer Protocol (SMTP), Transmission Control Protocol (TCP), and Internet Protocol (IP).

Figure 2:
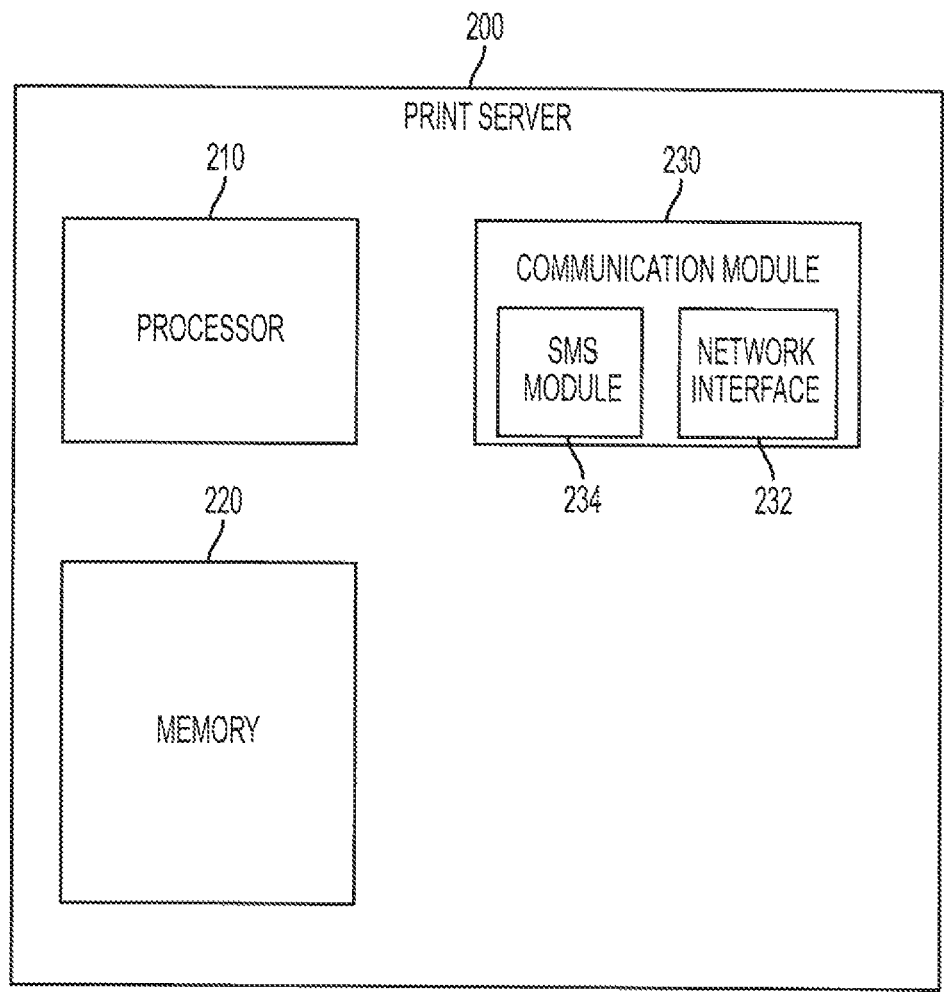
FIG. 2 is a diagram depicting an exemplary print server, consistent with certain disclosed embodiments.

FIG. 2 is a diagram depicting an exemplary print server, consistent with certain disclosed embodiments. As described above for print server 100 in FIG. 1, print server 200 can represent any type of computing device capable of sending and receiving text messages. Additionally, print server 200 can communicate with or be integrated with one or more document repositories and/or one or more printing devices. Further, print server 200 can be a single device or can include a plurality of devices.

Print server 200 can include, for example, one or more microprocessors 210 of varying core configurations and clock frequencies; one or more memory devices or computer-readable media 220 of varying physical dimensions and storage capacities, such as flash drives, hard drives, random access memory, etc., for storing data, such as images, files, and program instructions for execution by one or more microprocessors 210; one or more transmitters for communicating over network protocols, such as Ethernet, code divisional multiple access (CDMA), time division multiple access (TDMA), etc. Components 210 and 220 may be part of a single device, as disclosed in FIG. 2, or may be contained within multiple devices. Those skilled in the art will appreciate that the above-described componentry is exemplary only, as print server 200 may comprise any type of hardware componentry, including any necessary accompanying firmware or software, for performing the disclosed embodiments.

Further, print server 200 can include, for example, communication module 230. Communication module 230 can include network interface 232. Print server 200 can communicate with one or more document repositories and/or one or more printing devices via network interface 232. Print server 200 can additionally include SMS module 234. SMS module 234 can be enabled to listen for and receive text messages. Additionally, SMS module 234 can be enabled to transmit text messages.

Figure 3:
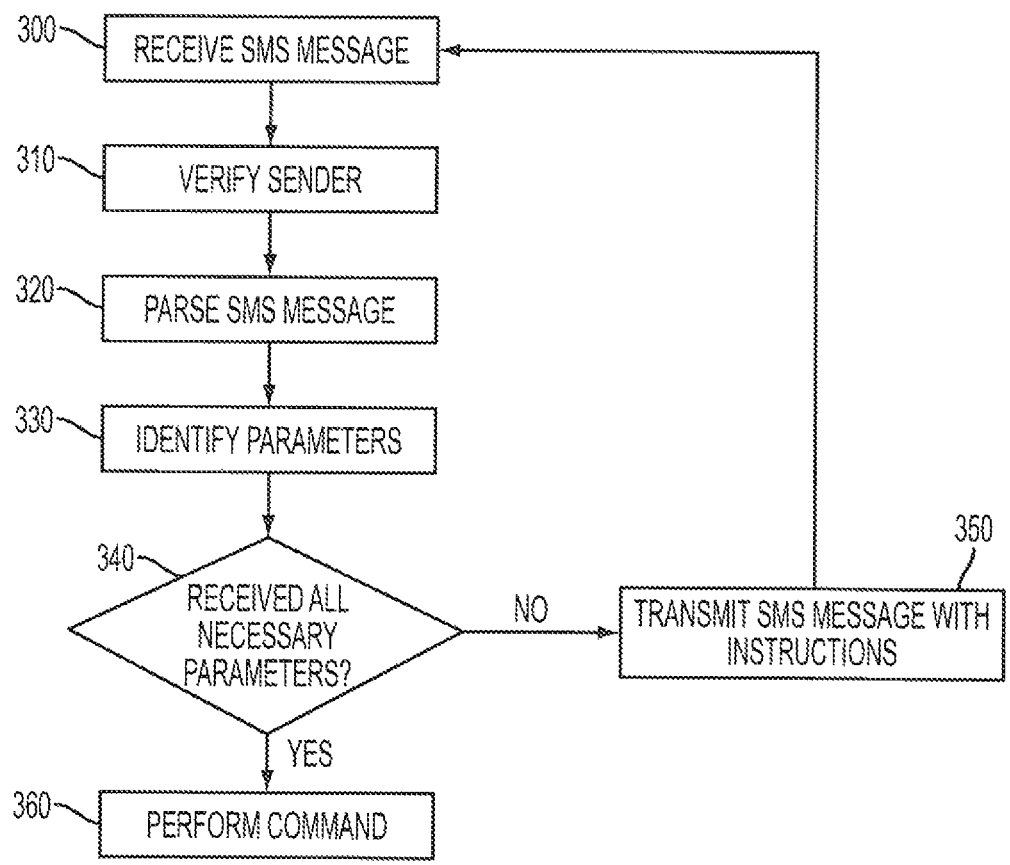
FIG. 3 is a flow diagram illustrating an exemplary method of implementing mobile print technology, consistent with certain disclosed embodiments.

FIG. 3 is a flow diagram illustrating an exemplary method of implementing mobile print technology, consistent with certain disclosed embodiments. In 300, the process can begin when a print server, such as print server 100 in FIG. 1, receives an SMS message from a mobile device, such as a feature phone.

In 310, the print server can verify whether the sender of the SMS message is authorized to access the print server. For example, the print server can verify the source phone number or Mobile Station International Subscriber Directory Number (MSISDN) and compare the number to an authorized list of numbers. The authorized list of numbers can include numbers added by users through user accounts associated with the print server. For example, a user can input his or her cellular phone number using his or her user account.

If the source number cannot be verified or is not authorized to access the print server, in embodiments, the print server can discard or ignore the SMS message. In other embodiments, the print server can send to the source number an SMS message including text indicating the source number cannot be verified or is not authorized to access the print server.

In 320, upon verification of the sender number, the print server can parse the SMS message. The SMS message can include and the print server can recognize one or more parsing characters, such as spaces, commas, or infrequently used characters, to allow the print server to efficiently parse the SMS message.

Examples of the SMS message and parsing characters can include:
PRINT DOC:3853;
PRINT 3853;
PRINT DOC 3853 PRINTER 5342 COPIES 2 COLOR BW.

In 330, the print server can identify commands and parameters included in the SMS message. For example, the SMS message can include command words including, but not limited to, "print" and "delete." The print server can identify the command word "print" as a command to release a document to a printer. Additionally, the print server can identify the command word "delete" as a command to delete a document from a document repository.

Additionally, the SMS message can include one or more parameters in the text of the message. For example, the SMS message can include parameters such as a requested document identification code, a requested printer identification code, a number of copies, and one or more printer settings. The text of the SMS message can indicate which parameter is being specified. For example, the SMS message can include the text "doc:3853" to specify that the requested document identification code is 3853. Additional examples include text such as "printer:5342," "copies-2," and "color bw" to indicate that, respectively, the requested printer identification code is 5342, the number of requested copies is two, and the desired printer setting for color is black and white. Additionally, in some embodiments, the print server can recognize parameters without parameter identifiers. For example, the print server can identify the type of parameter from the position of the parameter in the text. As an illustration, the SMS message may include the text "print 3853," and the print server can identify that the number 3853 indicates the document identification code.

Although the above examples utilized decimal numbers as document identification codes and printer identification codes, in embodiments, identification codes are not limited to decimal numbers and can include, but are not limited to, text, alphanumeric numbers, binary numbers, and hexadecimal numbers.

In embodiments, the print server can recognize a variety of abbreviations and misspellings of commands and parameter identifiers. For example, the SMS message may include the text "p d 3853," and the print server can identify that the character "p" represents a print command and that the character "d" indicates that the number 3853 is a document identification code.

In some embodiments, if the print server fails to identify some or all of the commands or parameters within the SMS message, the print server can ignore the SMS message or the print server can send an SMS message to the source number indicating the text that was unidentifiable. The SMS message sent by the print server can additionally include instructions and/or formats for commands and parameter identifiers.

In 340, the print server can determine whether an appropriate command has been received and/or whether a set number of parameters have been received to perform the command. For example, the print server may have only received a single SMS message with the text "print." The print server can determine that because the document identification code and printer identification code have not been received that a print command cannot be performed. Or, the print server may receive one or more SMS messages that, combined, include a print command, a document identification code, and a printer identification code. The print server may then determine receipt of sufficient parameters to release the requested document to the requested printer.

In some embodiments, the print server may not require all possible parameters before a command can be performed. For example, the print server may not require print color before a print command can be performed. Additionally, the print server may not require certain parameters if a user has previously specified default parameters via the users account. In embodiments, the user can utilize their user account to specify default parameters including a default printer identification code, default number of copies, and default printer configurations. Because the user's account is associated with the user's phone number, once the print server receives an SMS message with a print command, the print server may determine which default parameters have been preselected by the user. The print server may then utilize the default parameters specified in the user account when no similar parameters area identified in the SMS message.

If, in 340, the print server determines that additional parameters are required before the requested command can be performed, the print server can store the identified commands and parameters and proceed to 350. In 350, the print server can transmit an SMS message back to the source number with instructions regarding the additional parameters required. For example, if a document identification code is required, the print server can transmit to the source number an SMS message including text indicating that a document identification code is required and, in some embodiments, a suggested format for sending the required parameter.

In some embodiments, the print server can transmit an SMS message back to the source number with instructions detailing multiple parameters that are required before a command can be performed. In additional embodiments, the SMS message transmitted by the print server can request only a single additional required parameter even if multiple parameters are still required, which allows the user to send parameters to the print server one parameter at a time. For example, the print server can transmit an SMS message requesting a document identification code when both a document identification code and printer identification code are required. On a subsequent iteration, after the print server has received an SMS message with a document identification code, the print server can then transmit an SMS message requesting a printer identification code.

If, in 340, the print server determines that all necessary parameters have been received via one or more SMS messages, the print server can proceed to 360. In 360, the print server can perform the requested command using the provided parameters. For example, if a print command was requested with a document identification code and a printer identification code, the print server can send instructions to the document repository to release the requested document to the requested printer.

While the steps depicted in FIG. 3 have been described as performed in a particular order, the order described is merely exemplary, and various different sequences of steps can be performed, consistent with certain disclosed embodiments. Further, the steps described are not intended to be an exhaustive or absolute, and various steps can be inserted or removed. For example, in some embodiments, the print server may not verify the sender using the source phone number or may verify the source phone number after parsing the SMS message and/or identifying parameters. Additional embodiments may require additional information from the user for verification purposes, such as a username, a user password, etc.

Figure 4:
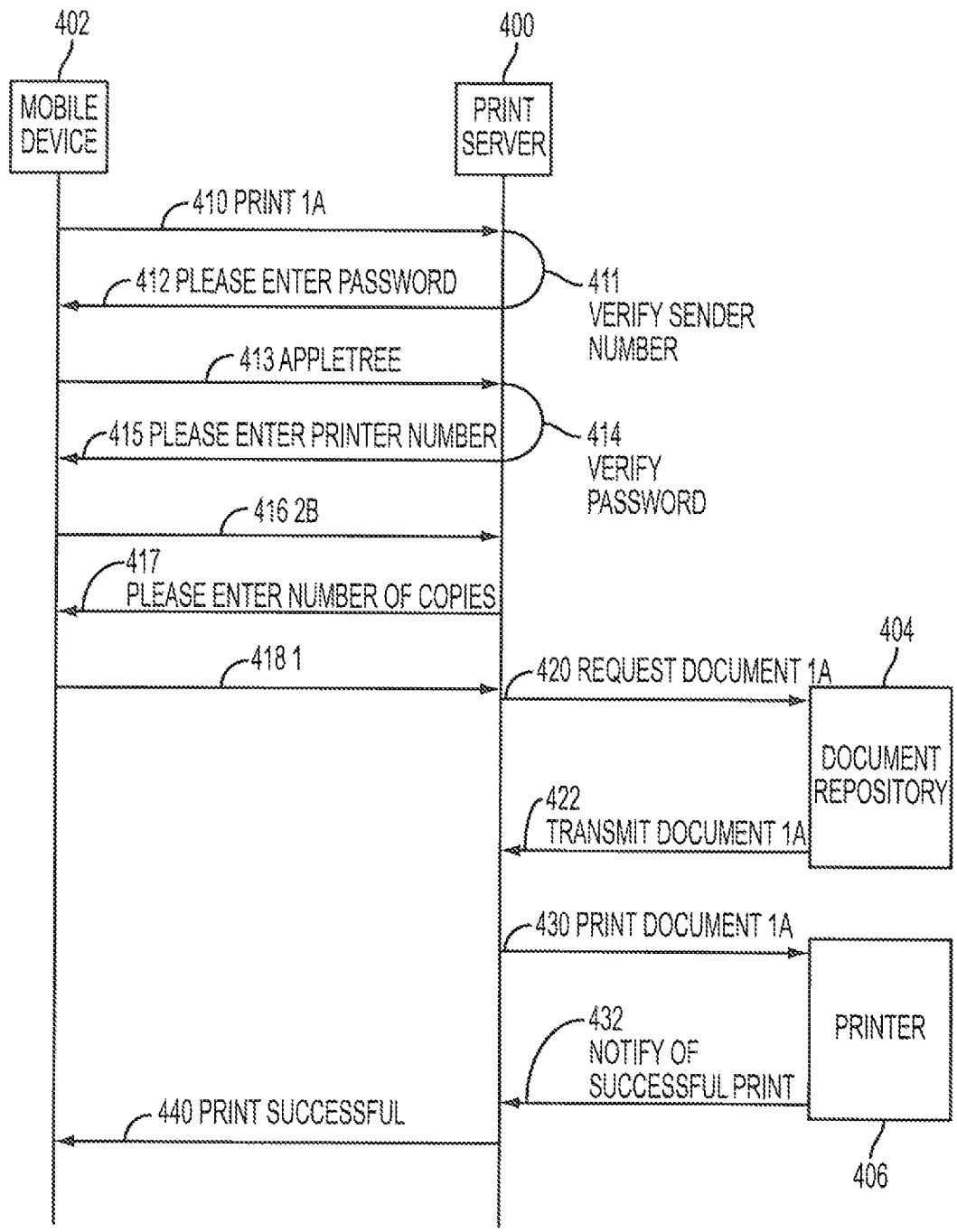
FIG. 4 is a flow diagram depicting an exemplary sequence of mobile print server communications, consistent with certain disclosed embodiments.

FIG. 4 is a flow diagram depicting an exemplary sequence of mobile print server communications, consistent with certain disclosed embodiments. It should be appreciated that the flowchart of FIG. 4 is merely exemplary and can comprise more or fewer functionalities.

The process can begin when a user account is created for a mobile print user. The user can access the account and set user settings and attributes. For example, the user can set the password "appletree" for accessing the user account or the mobile print system; the user can set authorized phone numbers, including the phone number of mobile device 402, for accessing the mobile print system; and the user can set default preferences, such as printer settings and parameter identifiers. The user account can additionally display preferred formats for SMS messages and allow the user to input preferred SMS message formats. Additionally, the user account can display a phone number assigned to print server 400, through which print server 400 can receive SMS messages with mobile print system commands. In embodiments, the user can access the user account using one or more of a web interface, a computer application, and a mobile application. In some embodiments, a user account may not be utilized.

The user, using a computing device, can subsequently submit a document to document repository 404. For example, the user can upload the document to document repository 404 using a web interface. Or, the user can utilize print driver software on the computing device that submits the document to document repository 404 after the user selects a print command. The document can be assigned the document identification code 1A, and the user can be notified of the assigned document identification code via, for example, the web interface or print driver software.

The flowchart begins when the user utilizes mobile device 402 to send a first SMS message with the text "Print 1A" to the phone number assigned to print server 400 (410). Print server 400 can receive the first SMS message and verify that the phone number assigned to mobile device 402 is authorized to access print server 400 (411). Because the user set the phone number of mobile device 402 as an authorized number, print server 400 can verify that mobile device 402 is authorized to communicate with print server 400. Print server 400 can parse the message and identify the print command. Additionally, print server 400 can identify that because of the position of the text "1A" that "1A" refers to a document identification code. Print server 400 can determine that a user password, a printer identification number, and a number of copies are still required to perform the print command. Accordingly, print server 400 can send a second SMS message with the text "Please Enter Password" to mobile device 402 (412).

Mobile device 402 can receive the second SMS message and display it to user. The user can respond by utilizing mobile device 402 to send a third SMS message with the text "appletree" to print server 400 (413). Print server 400 can receive the third SMS message, verify the phone number of mobile device 402, and parse the message, as described above. Additionally, print server 400 can verify that the password "appletree" is the password associated with the account of the user (414). Print server 400 can determine that a printer identification code and a number of copies are still required to perform the print command. Accordingly, print server 400 can send a fourth SMS message with the text "Please Enter Printer Number" to mobile device 402 (415).

Mobile device 402 can receive the fourth SMS message and display it to the user. The user can respond by utilizing mobile device 402 to send a fifth SMS message with the text "2B" to print server 400 (416). Print server 400 can receive the fifth SMS message, verify the phone number of mobile device 402, and parse the message, as described above. Print server 400 can determine a number of copies is still required to perform the print command. Accordingly, print server 400 can send a sixth SMS message with the text "Please Enter Number of Copies" to mobile device 402 (417).

Mobile device 402 can receive the sixth SMS message and display it to the user. The user can respond by utilizing mobile device 402 to send a seventh SMS message with the text "1" to print server 400 (418). Print server 400 can receive the seventh SMS message, verify the phone number of mobile device 402, and parse the message, as described above.

Print server 400 can determine that no further information is mandatorily required to perform the print command and can begin the print command by requesting document 1A from document repository 404 (420). Document repository 404 can transmit document 1A to print server 400 (422).

Print server 400 can determined that Printer 406 is associated with the printer identification code 2B, and print server 400 can submit document 1A along with a print request for one copy of document 1A to Printer 406 (430). Printer 406 can print document 1A and submit a notification to print server 400 that the print was successful (432). Print server 400 can then send a eighth SMS message with the text "Print Successful" to mobile device 402 (440)

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method for mobile print document release, the method comprising:

submitting a document to a document repository;

assigning a document identification code to the document;

storing an authorized phone number for a mobile device in a print server;

storing a user password in the print server;

receiving one or more first text messages from the mobile device, wherein the one or more first text messages comprise a mobile print command and the document identification code;

verifying that the one or more first text messages received from the mobile device are from the authorized phone number;

transmitting one or more second text messages to the mobile device requesting the user password;

receiving one or more third text messages from the mobile device with the user password;

transmitting one or more fourth text messages to the mobile device requesting a printer identification;

receiving one or more fifth text messages from the mobile device with the printer identification;

transmitting one or more sixth text messages to the mobile device requesting a number of copies of the document to be printed;

receiving one or more seventh text messages from the mobile device with the number of copies of the document to be printed;

transmitting one or more eighth text messages to the mobile device when a format of the mobile print command or the document identification code is unidentifiable, wherein the one or more eighth text messages include instructions to use an updated format, and wherein the instructions comprise a sample of the updated format;

receiving one or more ninth text messages from the mobile device, wherein the one or more ninth text messages comprise the mobile print command, the document identification code, or both in the updated format;

parsing the one or more ninth text messages to identify the document identification code;

obtaining, using the document identification code, the document that is identified by the document identification code;

releasing the document to a printer; and transmitting one or more tenth text messages from the print server to the mobile device indicating that the document has been printed.

2. The method of claim 1, the method further comprising:
determining further information is required to perform the mobile print command; and
sending one or more instruction text messages to the mobile device.

3. The method of claim 1, wherein the printer is associated with the printer identification.

4. The method of claim 1, wherein the document is obtained from the document repository based on the document identification code.

5. The method of claim 1, wherein the one or more first text messages are SMS messages.

6. The method of claim 1, wherein the one or more first text messages further comprise printer configurations.

7. The method of claim 1, wherein the one or more eighth text messages indicate that the format of the mobile print command or the document identification code is unidentifiable.

8. The method of claim 1, wherein the format of the mobile print command or the document identification code is unidentifiable when the mobile print command or the document identification code does not match a stored mobile print command or a stored document identification code.

9. A system configured for mobile print document release, the system comprising:
a processing system comprising one or more processors; and
a memory system comprising one or more computer-readable media, wherein the one or more computer-readable media contain instructions that, when executed by the processing system, cause the processing system to perform operations comprising:
submitting a document to a document repository;
assigning a document identification code to the document;
storing an authorized phone number for a mobile device in a print server;
storing a user password in the print server;
receiving one or more first text messages from the mobile device, wherein the one or more first text messages comprise a mobile print command and the document identification code;

verifying that the one or more first text messages received from the mobile device are from the authorized phone number;

transmitting one or more second text messages to the mobile device requesting the user password;

receiving one or more third text messages from the mobile device with the user password;

transmitting one or more fourth text messages to the mobile device requesting a printer identification;

receiving one or more fifth text messages from the mobile device with the printer identification;

transmitting one or more sixth text messages to the mobile device requesting a number of copies of the document to be printed;

receiving one or more seventh text messages from the mobile device with the number of copies of the document to be printed;

transmitting one or more eighth text messages to the mobile device when a format of the mobile print command or the document identification code is unidentifiable, wherein the one or more eighth text messages include instructions to use an updated format, and wherein the instructions comprise a sample of the updated format;

receiving one or more ninth text messages from the mobile device, wherein the one or more ninth text messages comprise the mobile print command, the document identification code, or both in an updated format;

parsing the one or more ninth text messages to identify the document identification code;

obtaining, using the document identification code, the document that is identified by the document identification code;

releasing the document to a printer; and transmitting one or more tenth text messages from the print server to the mobile device indicating that the document has been printed.

10. The system of claim 9, the operations further comprising:
determining further information is required to perform the mobile print command; and
sending one or more instruction text messages to the mobile device.

11. The system of claim 9, wherein the printer is associated with the printer identification.

12. The system of claim 9, wherein the document is obtained from the document repository based on the document identification code.

13. The system of claim 9, wherein the one or more first text messages are SMS messages.

14. The system of claim 9, wherein the one or more first text messages further comprise printer configurations.

* * * * *